United States Patent [19]
Barr et al.

[11] Patent Number: 6,139,725
[45] Date of Patent: Oct. 31, 2000

[54] OIL RECLAMATION DEVICE WITH VAPORIZATION CHAMBER

[75] Inventors: Richard Henry Howard Barr, Torquay; Albert Neal Davies, Newton Abbot, both of United Kingdom

[73] Assignee: Purdayn Filter Technologies Inc, Boynton Beach, Fla.

[21] Appl. No.: 09/117,031

[22] PCT Filed: Jan. 21, 1997

[86] PCT No.: PCT/GB97/00179

§ 371 Date: Sep. 22, 1998

§ 102(e) Date: Sep. 22, 1998

[87] PCT Pub. No.: WO97/26978

PCT Pub. Date: Jul. 31, 1997

[30] Foreign Application Priority Data

Jan. 22, 1996 [GB] United Kingdom .................. 9601220

[51] Int. Cl.[7] .................................................. B01D 35/147
[52] U.S. Cl. ................................. 210/90; 210/85; 210/91; 210/130; 210/132; 210/149; 210/180; 210/183; 210/184; 210/315; 210/DIG. 13; 195/46.1
[58] Field of Search .................................... 210/149, 317, 210/180, 90, 111, 186, 183, 132, 315, 85, 418, 91, 182, 130, 436, 184, DIG. 13; 196/46, 46.1

[56] References Cited

U.S. PATENT DOCUMENTS

| | | |
|---|---|---|
| 2,839,196 | 6/1958 | Schwalge . |
| 3,331,509 | 7/1967 | Gary, Jr. et al. . |
| 4,146,475 | 3/1979 | Forsland . |
| 4,189,351 | 2/1980 | Engel . |
| 4,227,969 | 10/1980 | Engel . |
| 4,289,583 | 9/1981 | Engel . |
| 4,329,226 | 5/1982 | Thompson ............................... 210/180 |
| 4,443,334 | 4/1984 | Shugarman et al. . |
| 4,943,352 | 7/1990 | Lefebvre et al. . |
| 5,198,104 | 3/1993 | Menyhert . |
| 5,458,767 | 10/1995 | Stone ......................................... 210/90 |
| 5,520,801 | 5/1996 | Gerber et al. . |
| 5,824,211 | 10/1998 | Lowry ....................................... 210/92 |

FOREIGN PATENT DOCUMENTS

| | | |
|---|---|---|
| 0 285 416 | 10/1988 | European Pat. Off. . |
| 2335276 | 2/1974 | Germany . |
| 843165 | 8/1960 | United Kingdom . |
| 1087567 | 10/1967 | United Kingdom . |

*Primary Examiner*—W. L. Walker
*Assistant Examiner*—Terry K. Cecil
*Attorney, Agent, or Firm*—Nixon & Vanderhye

[57] ABSTRACT

An oil reclamation device includes a full flow filter (10) fitted around a partial flow filter (12) within an open-ended casing (8). The open end of the casing is capped by a housing defining a vaporization chamber (6). In normal operation, oil flows from oil passage (14) through the full flow filter (10) to a branched leg (22). A metering jet (34) provided in the branched leg allows a minor portion of the oil to flow through the partial flow filter and then into the vaporization chamber. The full flow filter extracts solid contaminants having a particle size of 15 microns or greater. The partial flow filter extracts solid contaminants of 1 micron or greater. The filter element of the partial flow filter is composed of compressed cotton fibers and preferably has a higher density in an upper end adjacent the vaporization chamber. In the vaporization chamber, liquid contaminants are removed from the minor portion by a heating element (72). The temperature within the chamber is monitored and controlled by a thermocouple (74) and an indicating device is also provided to warn an operator when the temperature is not within an acceptable range. The oil passage includes a bypass valve (28) so that oil can bypass the full flow filter when it is clogged. An audible or visual indicating means is provided to warn an operator when the bypass valve is opened.

14 Claims, 2 Drawing Sheets

OIL RECLAMATION DEVICE WITH VAPORIZATION CHAMBER

This invention relates to an oil reclamation device for reconditioning oil used in machinery such as a vehicle engine or a hydraulic system.

BACKGROUND OF THE INVENTION

Oil reclamation devices are already known which condition a bypass flow of oil and work in tandem with a conventional full flow oil filter. In many applications, it is difficult to site the oil reclamation device such that there is easy access to the replaceable components of the oil reclamation device. The problem is accentuated because it is desirable to site the oil reclamation device close to the full flow oil filter, so that both of them can be accessed and serviced at the same time.

SUMMARY OF THE INVENTION

According to a first aspect of the present invention there is provided an oil reclamation device comprising, in a single unit:

a full flow filter for extraction of solid contaminants;
 a partial flow filter for extraction of solid contaminants of small particle size; and
 a housing defining a vapourising chamber for extraction of liquid contaminants.

Because the full flow filter, partial flow filter and vapourising chamber are all combined in a single unit, the oil reclamation device is compact and easy to service.

Preferably, the full flow filter and partial flow filter are fitted to the housing of the vapourising chamber.

Preferably the full flow filter extracts solid contaminants having a particle size of 15 microns or greater and the partial flow filter extracts solid contaminants having a particle size of 1 micron or greater.

Preferably, the full flow filter is fitted around the partial flow filter. The full flow filter and partial flow filter may be fitted within a casing which is fitted to the housing of the vapourising chamber. The casing may comprise an oil flow passage which directs oil through the full flow filter and through the partial flow filter. The oil passage may contain a bypass valve which allows oil to bypass the full flow filter if it becomes blocked.

The bypass valve may comprise means for detecting the operative state of the valve. Means may be provided for indicating to an operator of the machinery, to which the oil reclamation device is fitted, that the bypass valve is open. The indicating means may comprise a warning light on an indicator panel, although any suitable device is contemplated, such as a warning buzzer or bell. If the machinery comprises an internal combustion engine, the means for detecting the operative state of the valve may provide an output to an engine management system, which may for example prevent the engine being restarted while the bypass valve is blocked or may otherwise indicate to an operator that servicing is required.

The oil passage may be provided with an oil drain tap from which oil samples may be taken. The oil may then be analysed to determine its conditions.

Preferably, the flow of oil from the oil passage into the partial flow filter is controlled by a non-return valve which prevents contaminants from the partial flow filter falling back into the oil passage if the oil pressure in the oil passage subsides.

The partial flow filter may be fed by a metering jet and preferably comprises a filter element of compressed cotton fibre. Preferably, a coarse filter is provided beneath the metering jet to prevent contaminants in the oil passage blocking the jet if the full flow filter becomes clogged and the bypass valve opens.

According to a second aspect of the present invention there is provided an oil reclamation device comprising a housing defining a vapourising chamber and a heating device for heating the housing, means being provided for detecting the temperature of the housing.

Preferably, means are provided for controlling the output of the heating device in response to the detected temperature of the housing. An indicating device may be provided to warn an operator of machinery to which the oil reclamation device is fitted that the temperature of the housing of the vapourising chamber is not within an acceptable range.

BRIEF DESCRIPTION OF THE DRAWING

For a better understanding of the present invention, and to show how it may be carried into effect, reference will now be made, by way of example, to the accompanying drawings in which.

DETAILED DESCRIPTION OF PREFERRED EMBODIMENTS

Figure 1:
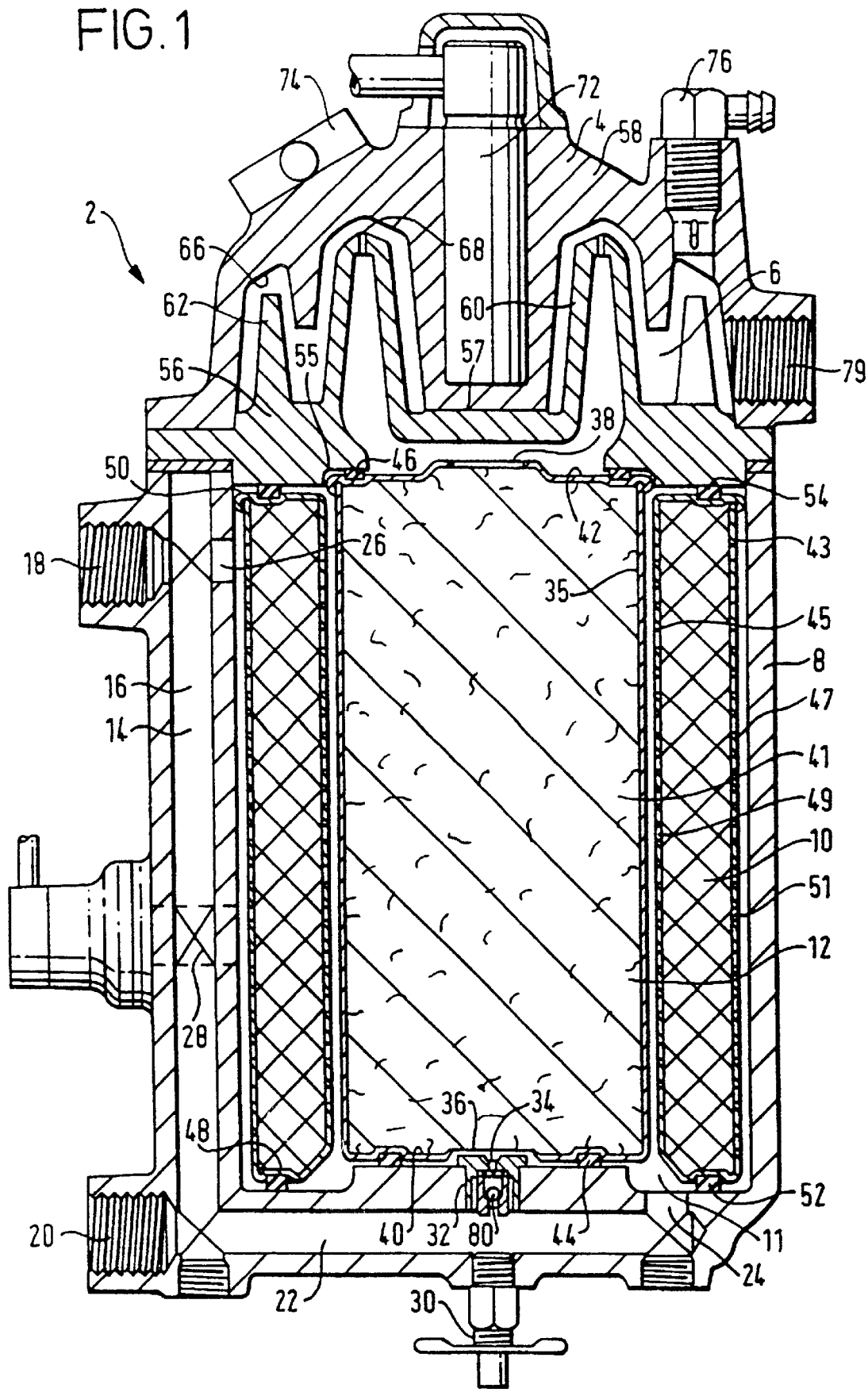
FIG. 1 is a cross-section through an oil reclamation device.

Referring to FIG. 1, an oil reclamation device, indicated generally at 2, comprises a housing 4, defining an oil vapourisation chamber 6, capped over an open end of a casing 8 which contains a full flow filter 10 and a partial flow filter 12.

A substantially L-shaped oil passage 14 is provided in the casing 8. A first branch leg 16 of the oil passage 14 extends from an oil inlet 18 at the top of the casing 8 to an oil outlet 20 at the bottom of the casing 8. An opening 26 is provided at the upper end of the first branch leg 16 of the oil passage 14 to communicate the upper end of the oil passage 14 with the interior of the casing 8. A second branch leg 22 of the oil passage 14 extends from the oil outlet 20 to an opening 24 which communicates the lower end of the oil passage 14 with the interior of the casing 8.

A bypass valve 28 extends across the first branch leg 16 of the oil passage 14 through the wall of the casing 8. In its normally closed condition, the bypass valve 28 prevents flow of oil along the first branch leg 16.

Situated along the second branch leg 22 substantially centrally with respect to the oil reclamation device 2 as a whole, is located a bleed valve 30 which extends through the wall of the casing towards the exterior of the oil reclamation device 2. A metering jet housing 32, situated above the bleed valve 30, extends inwardly through the wall of the casing 8 and provides fluid communication between the second branch leg 22 of the oil passage 14 and the interior of the partial flow filter 12.

The partial flow filter 12 comprises a pressed steel cylindrical canister 35 having centrally disposed apertures 36, 38 in its upper and lower end walls 40, 42. The lower end wall 40 is sealed to the casing 8 by means of an O-ring seal 44 and the upper end wall 42 is sealed to the housing 4 by means of an O-ring seal 46. The partial flow filter 12 is oriented such that its longitudinal axis is coaxial with a metering jet 32 provided in the metering jet housing 34.

The partial flow filter 12 comprises a filter element 41 of twisted continuous filaments of unbleached natural cotton. The density of the filament is greater at the upper end than the lower end of the filter element 41, so that large particles tend to be trapped by the low density lower portion while smaller particles are trapped by the high density upper portion. In this way the useful life of the filter is extended and its operation is more efficient.

The full flow filter 10 is situated around the partial flow filter 12 and is slightly spaced from it to create an annular chamber 11. The full flow filter comprises an annular pressed steel canister 43 having inner and outer longitudinally disposed side walls 45, 47 which are provided with a plurality of small apertures 49, 51 over their entire surface area. The canister 43 is closed by upper and lower solid end walls 48, 50. The lower end wall 48 is sealed to the interior of the casing 8 by means of an O-ring seal 52 and the upper end wall of the canister 50 is sealed to the housing 4 by means of an O-ring seal 54.

The housing 4 is formed from aluminium and is cast in two parts 56, 58. The lower housing part 56 comprises an annular base portion 55 connected to a discontinuous convoluted thin wall portion 60 which is substantially M-shaped in the illustrated cross-section. A discontinuous annular flange 62 is formed integrally with base portion 55 and projects upwardly from it.

The upper housing part 58 of the housing 4 comprises a cover which engages the lower housing part 56 around the periphery of the base portion 55 and at its central portion 57. The upper housing part 58 has an inwardly facing wall 66 which is spaced from and conforms to the contours of the lower housing part 56. The oil vapourisation chamber 6 is defined between the upper and lower housing parts 56, 58.

Apertures 68 are formed around an upper part 60 of the thin wall portion 66 of the lower housing part 56 to provide fluid communication between the interior of the partial flow filter 12 and the interior of the vapourisation chamber 6. Preferably, about ten aperture 68 are provided, each about 1½ mm in diameter.

A heating element 72 is mounted centrally within the upper housing part 58 and is powered by a battery (not shown) which is used to start the internal combustion engine. Power may alternatively be supplied by any other source of electrical energy appropriate to a particular application.

A thermocouple 74 is mounted on the upper housing part 58 to one side of the heating element 72 and a vapour outlet 76 is located through the upper housing part 58 on the other side of the heating element 72. An oil outlet 79 is provided through the upper housing part 58 beneath the vapour outlet 76.

Figure 2:
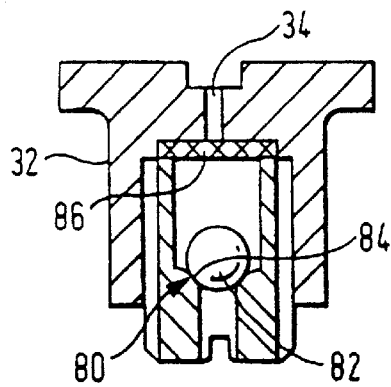
FIG. 2 is an enlarged view of a metering jet, coarse filter and non-return valve fitted to the oil reclamation device.

Referring to FIG. 2, the metering jet housing 32 comprises a non-return valve 80 situated beneath the metering jet 34. The non-return valve 80 comprises a ball 82 which rests on a seat 84 formed in the metering jet housing 32. The non-return valve 80 prevents solid contaminants from the interior of the partial flow filter 12 dropping back into the oil passage 14 when the pressure in the oil passage 14 subsides (i.e. when an engine to which the oil reclamation device is fitted is switched off) and also prevents the loss of oil when the casing 8 is removed from the housing 4 during a filter replacement operation.

A coarse filter 86 is fitted in the metering jet housing 32 between the metering jet 34 and the non-return valve 80.

Figure 3:
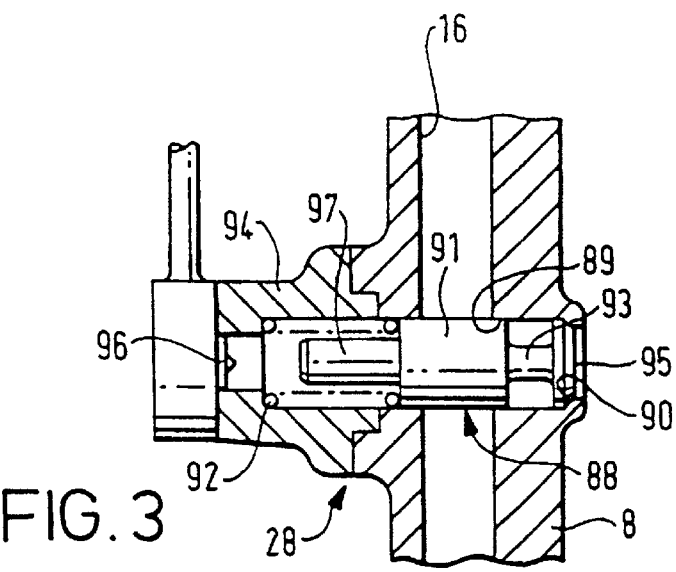
FIG. 3 is an enlarged view of an oil bypass valve provided in the oil reclamation device.

Referring to FIG. 3, the bypass valve 28 comprises a valve element 88 which is fitted within a bore 89 through a wall of the casing 8. The valve element 88 comprises a body portion 91, which is a close fit within the bore 89, and a waisted portion 93 which is fixed between the body portion 91 and a sealing element 95. The valve element 88 is held against an abutment 90 formed on an inner wall of the casing 8, under the action of a spring 92. Fitted to an outside surface of the casing 8 is a cap 94 which locates the spring 92 and supports an electrical contact 96. An end 97 of the body portion 91 is extended towards the electrical contact 96.

Figure 4:
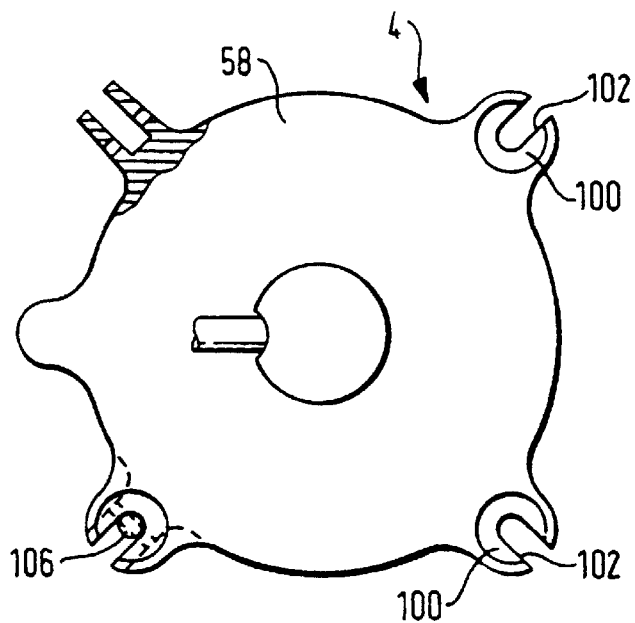
FIG. 4 is a view from above, partly in section, of the top of a housing of the oil reclamation device.
Figure 5:
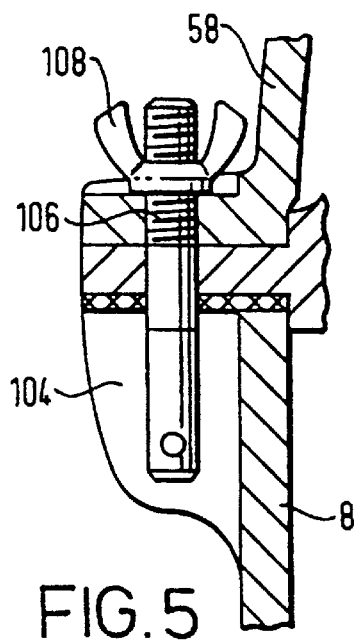
FIG. 5 is an enlarged view of a fixing arrangement by which the housing of FIG. 4 is fitted to a casing of the oil reclamation device.

Referring to FIGS. 4 and 5, the upper housing part 58 of the housing 4 comprises a substantially circular disc having equidistantly spaced projections 100 around its circumference. Each projection 100 is provided with a centrally disposed recess 102. Four projections 104 are formed on the casing 8, at an equidistant spacing around its upper end. Each projection 104 pivotally supports a threaded shaft 106 which engages in a corresponding one of the recesses 102 and is retained by a wing nut 108.

The oil reclamation device has many applications, but for the purpose of explaining the operation of the device, it is to be assumed that it is connected to an internal combustion engine.

In use, pressurized oil from the oil pump (not shown) of the internal combustion engine is introduced to the oil passage 14 through the oil inlet 18. In normal operation, the bypass valve 28 is closed so that oil is forced through the upper opening 26 into the interior of the casing 8. From here, it passes through the apertures 51 in the outer side wall 47 of the full flow filter 10 through the filter element and out through the apertures 49 in the inner side wall 45 into the annular chamber 11 between the partial flow filter 12 and the full flow filter 10. The oil then passes out of the casing 8 through the lower opening 24 into the second branch leg 22 of the oil passage 14. The bulk of the oil leaves the casing 8 through the oil outlet 20 and is returned to the engine, still under pressure, to be used for lubrication.

A proportion of the oil in the second branch leg 22 of the oil passage 14 passes through the non-return valve 80 and coarse filter 86 in to the metering jet 34. The oil is ejected from the metering jet 34 as a fine spray and is forced through the filter element 41 to the aperture 38 in the end wall 42 of the canister 35. The use of a metering jet 34 not only ensures good dispersion of the oil over the filter element 41, but also ensures that only a small proportion of the high pressure oil is diverted through the partial flow filter, rather than being used for lubrication of the engine. It has been found that a bypass flow of approximately 6% of the total flow is appropriate for most applications.

As the oil passes through the filter element 41, the large particles are trapped by the low density lower portion of the filament and the smaller particles are trapped by the higher density upper portion of the filament so that the oil leaving the partial flow filter through the aperture 38 is free from solid contaminant particles larger than 1 micron.

This filtered oil is forced upwardly into the housing 4 and is then ejected through the apertures 68 in the thin wall portion 66 of the lower housing part 56 into the vapourisation chamber 6.

Electrical energy is supplied to the heating element 72 which heats the entire upper housing part 58 by conduction.

The heating element 72 also heats the lower housing part 58 by conduction due to the good heat transmitting surface contact between the upper and lower housing parts 56, 58 around their peripheral edges and directly beneath the heating element 72.

The heat supplied should be sufficient to evaporate the light liquids in the oil, such as fuel, water and antifreeze, or like contaminants, without evaporating a substantial amount of the oil itself. To achieve this, the housing 4 is preferably maintained within a temperature range of 90.6 to 93.3° C. (195 to 200° F.).

The thermocouple 74 constantly monitors the temperature of the housing 4 and by means of suitable circuitry (not shown) controls the operation of the heating element 72 to maintain the required temperature range. The heating element 72 may, alternatively, be provided with a thermostat which controls its heat output.

The thermocouple 74 may operate an indicating device (not shown) which warns an operator of the internal combustion engine, if the temperature of the housing 4 is not within the desired range.

The evaporated contaminants pass out of the housing 4 through the vapour outlet 76 and are then vented to the atmosphere or may alternatively be fed back into the inlet to the engine to be burnt during combustion.

The filtered oil adheres to the walls of the vapourisation chamber 6 and gradually passes through the vapourisation chamber along a torturous path until it passes out of the oil reclamation device through the outlet 79. A length of clear plastic pipe may be connected to the outlet 79 so that an immediate check can be made as to whether oil is flowing properly through the oil reclamation device. The pipe also providing a visual indication of the condition of the oil leaving the reclamation device.

During its passage through the oil vapourisation chamber 6, the oil is constantly maintained at a temperature sufficient to cause evaporation of liquid contaminants, so that the oil leaving the oil reclamation device through the outlet 79 is substantially free of liquid contaminants.

The vapourisation chamber 6 is at low pressure to facilitate the evaporation of the contaminants and hence the oil is returned to the engine sump from the outlet 79 under the action of gravity.

Referring to FIGS. 1 and 3, if the full flow filter 10 becomes clogged, so that the oil pressure rises within the casing 8, at a certain point, the force on the sealing element 95 of the valve element 88 will overcome the force of the spring 92. Consequently, the valve element 88 will be driven away from the abutment 90, thereby aligning the waisted portion 93 of the valve element 88 with the oil passage 14 and permitting the flow of oil past the bypass valve 28. At the same time, the extended end 97 of the valve element 88 is driven into the electrical contact 96, causing a warning signal to be generated on the operating panel of the internal combustion engine. In this way, an operator of the machine is aware that the bypass valve 28 has opened and hence that the full flow filter 10 must be replaced.

At the prescribed service internals or when a warning is given that the bypass valve 28 is open, the full flow filter and partial flow filter 12 can be replaced by unscrewing the wing nuts 108 and separating the housing 4 from the casing 8. The old filter canisters and O-ring seals may then be removed and replaced with fresh components, as in a conventional filter replacement operation. The housing 4 is then located over a gasket on the casing 8 and the threaded shafts 106 are pivoted up into respective recesses 102 on the upper housing part 58. The wing nuts 108 are then screwed onto the threaded shafts 106 to secure the housing 4 to the casing 8.

Before the casing 8 is separated from the housing 4, a sample of oil may be drawn off through the bleed valve 30 and sent away for analysis. The bleed valve 30 may also be used to completely drain the oil passage 14, to prevent spillage of oil during the filter replacement operation.

The oil reclamation device has been illustrated such that the housing 4 is mounted above the casing 8. However, in an alternative embodiment, not illustrated, the oil reclamation device may be mounted in an inverted state requiring only minor modifications, for example to the non-return valve 80 in the metering jet housing 32.

The present invention is applicable not only to oil reclamation devices in which the filter elements are contained in a removable casing, but is also applicable to an oil reclamation device having solid canister "spin-on" filters. In such an embodiment both filters would be screwed onto the housing 4, for example, one beside the other or one inside the other. Also a single spin-on filter is contemplated which contains both a full flow filter and a partial flow filter. In order to provide the necessary distribution of oil through the filter elements, the oil flow passage 14 would be incorporated into the housing 4.

The oil returned to the engine from the outlet 79 of the oil reclamation device is substantially free of solid contaminant particles greater than 1 micron and is also substantially free of liquid contaminants.

Consequently, the oil is substantially reconditioned and refined and is suitable for extended use. For example, an internal combustion engine in a vehicle could be expected to run for hundreds of thousands of miles on the same oil if an oil reclamation device according to the present invention is fitted. However a problem particularly associated with lubricated internal combustion engines such as in motor vehicles is that oxidation and sulphur acidification of the oil commonly occur. Therefore, in an embodiment of the invention, not illustrated, a thermoplastic material which gradually dissolves in above ambient temperature oil is located within the filter media of the full flow filter 10 or the partial flow filter 12. The material has oil oxidation and acidification arresting additives which are released into the oil over time as the material dissolves.

What is claimed is:

1. An oil reclamation device comprising
   a. a casing including an opened end, an inlet, and at least one outlet;
   b. a full flow filter mounted in said casing;
   c. a partial flow filter mounted within the periphery of said full flow filter;
   d. means defining a branched passage with one leg beneath said filters and in receipt of said full-flow filtered fluid;
   e. a metering jet in fluid communication with said leg, said metering jet metering a minor portion of said fluid flowing through said leg, said minor portion of fluid being filtered by said partial flow filter; and
   f. a housing capping and in fluid communication with said opened end of said casing, said housing defining a vaporization chamber for extraction of liquid contaminants from said filtered minor portion.

2. An oil reclamation device as claimed in claim 1, in which the housing is provided with a heating device.

3. An oil reclamation device as claimed in claim 2, in which the housing is provided with temperature detecting means.

4. An oil reclamation device as claimed in claim 3, in which means are provided for controlling the output of the heating device in response to the output of the temperature detecting means.

5. An oil reclamation device as claimed in claim 4, in which an indicating device is provided to warn an operator of machinery to which the oil reclamation device is fitted that the temperature of the housing of the vapourisation chamber is not within an acceptable range.

6. An oil reclamation device as claimed in claim 1, in which said branched passage contains a bypass valve which opens to allow oil to bypass the full flow filter if the full flow filter becomes clogged.

7. An oil reclamation device as claimed in claim 6, in which means is provided for detecting whether the full flow filter is clogged.

8. An oil reclamation device as claimed in claim 7, in which the means for detecting whether the full flow filter is clogged comprises means for detecting the operative state of the bypass valve.

9. An oil reclamation device as claimed in claim 6, in which means is provided for indicating to an operator of machinery to which the oil reclamation device is fitted that the filter is clogged.

10. An oil reclamation device as claimed in claim 9, in which the indicating means comprises a warning light on an indicator panel.

11. An oil reclamation device as claimed in claim 9, in which the indicating means emits an audible warning.

12. An oil reclamation device as claimed in claim 1, in which the branched passage is provided with an oil drain tap.

13. An oil reclamation device as claimed in claim 1, in which a coarse filter is provided beneath the metering jet.

14. An oil reclamation device as claimed in claim 1, in which said partial full filter comprises a filter element of compressed cotton fibre.

* * * * *